US007124928B2

United States Patent
Conover et al.

(10) Patent No.: US 7,124,928 B2
(45) Date of Patent: Oct. 24, 2006

(54) OPTICAL COMPONENT INSTALLATION AND TRAIN ALIGNMENT PROCESS UTILIZING METROLOGY AND PLASTIC DEFORMATION

(75) Inventors: Steven D. Conover, Chelmsford, MA (US); Randal A. Murdza, North Andover, MA (US); Margaret A. Stern, Sudbury, MA (US)

(73) Assignee: Axsun Technologies, Inc., Billerica, MA (US)

( * ) Notice: Subject to any disclaimer, the term of this patent is extended or adjusted under 35 U.S.C. 154(b) by 0 days.

(21) Appl. No.: 09/761,514

(22) Filed: Jan. 16, 2001

(65) Prior Publication Data

US 2006/0208035 A1  Sep. 21, 2006

(51) Int. Cl.
B23K 31/02 (2006.01)
G02B 7/00 (2006.01)
(52) U.S. Cl. .................. 228/103; 228/105; 359/819
(58) Field of Classification Search ............ 228/122.1, 228/123.1, 124.6, 103, 105, 180.1, 180.21; 359/819; 385/92, 93
See application file for complete search history.

(56) References Cited

U.S. PATENT DOCUMENTS

| 4,725,114 | A | * | 2/1988 | Murphy ................... 350/96.17 |
| 4,854,667 | A | * | 8/1989 | Ebata et al. ............... 350/96.2 |
| 5,249,733 | A | * | 10/1993 | Brady et al. ........... 228/180.22 |
| 5,793,540 | A | * | 8/1998 | Ohtsuki et al. ............. 359/819 |
| 5,896,481 | A | * | 4/1999 | Beranek et al. ............... 385/90 |
| 6,164,837 | A | | 12/2000 | Haake et al. .................. 385/90 |
| 6,207,950 | B1 | * | 3/2001 | Verdiell ...................... 250/239 |
| 6,282,036 | B1 | * | 8/2001 | Woytassek et al. ......... 359/822 |
| 6,416,937 | B1 | * | 7/2002 | Flanders et al. ............. 430/321 |
| 6,467,680 | B1 | * | 10/2002 | O'Connor et al. .......... 228/245 |
| 6,492,614 | B1 | * | 12/2002 | Murdza et al. ........ 219/121.64 |
| 6,543,114 | B1 | * | 4/2003 | Atia et al. ................ 29/407.04 |

FOREIGN PATENT DOCUMENTS

| DE | 198 05 849 | * | 2/1999 |
| DE | 198 05 849 A1 | * | 2/1999 |
| DE | 198 05 849 A1 | | 9/1999 |
| JP | 01244405 | | 9/1989 |
| JP | 1-310314 | * | 12/1989 |
| JP | 01319008 | | 12/1989 |
| JP | 9-152526 | * | 6/1997 |
| WO | WO 91/06022 | | 5/1991 |
| WO | WO 99/26754 | | 6/1999 |
| WO | WO 00/42629 | | 7/2000 |
| WO | WO 01/37005 A2 | | 5/2001 |

* cited by examiner

Primary Examiner—Kevin P. Kerns
(74) Attorney, Agent, or Firm—Houston Eliseeva LLP (57) ABSTRACT

A micro-optical train manufacturing process includes a step of characterizing the position of optical components on an optical bench, typically using a metrology system. These optical components are then aligned with respect to each other in a passive alignment step based on data from the metrology system and optical system design information. As a result, a subsequent active align process can be avoided in some situations, or if a subsequent active alignment process is performed, the time required for that active alignment process can be reduced because of this initial metrology-based passive alignment step.

48 Claims, 6 Drawing Sheets

OPTICAL COMPONENT INSTALLATION AND TRAIN ALIGNMENT PROCESS UTILIZING METROLOGY AND PLASTIC DEFORMATION

BACKGROUND OF THE INVENTION

Component alignment is of critical importance in microoptical systems and especially semiconductor and/or MOEMS (microoptical electromechanical systems) optical system manufacturing. The basic nature of light requires that light generating, transmitting, and modifying components must be positioned accurately with respect to one another, especially in the context of free-space-interconnect optical systems, in order to function properly and effectively. Scales characteristic of optical semiconductor and MOEMS technologies can necessitate micron to sub-micron alignment accuracy.

Consider the specific example of coupling light from a semiconductor diode laser, such as a pump or transmitter laser, to single mode fiber. Only the power that is coupled into the fiber core is usable, and the coupling efficiency is highly dependent on accurate alignment between the laser output facet and the core; inaccurate alignment can result in partial or complete loss of signal transmission through the optical system. Moreover, if polarization-maintaining fiber is used, there is an added need to rotationally align the fiber relative to the laser to maintain the single polarization characteristic of the output signal.

Other more general examples include optical amplification, receiving and/or processing systems. Some alignment is typically required between an optical signal source, such as the fiber endface, and a detector. In more complex systems including tunable filters, for example, alignment is required not only to preserve signal power, dynamic range, but also to yield high quality systems through the suppression of undesirable optical modes within and without the systems.

In the example of a tunable filter system, light, typically provided by fiber, is supplied to an optical train, including a tunable filter, such as a Fabry-Perot (FP) tunable filter. The launch characteristics of the light into the FP filter cavity determine the side mode suppression ratio (SMSR) of the system. This ratio, in part, dictates the quality of the system. If light is launched into the filter at the wrong position or with the wrong spot size, higher order modes are excited in the filter, degrading the system's SMSR. Typically, filter train alignment is employed to extract the highest possible SMSR.

Generally, there are two types of alignment strategies: active and passive. Typically, in passive alignment of the optical components, registration or alignment features are fabricated directly on the optical components, such as the optical elements or element mounting structures, as well as on the platform to which the components are to be mounted. The components are then mounted and bonded directly to the platform using the alignment features. In active alignment, an optical signal is transmitted through the components and detected. The alignment is performed based on the transmission characteristics to enable the highest possible performance level for the system.

In the context of commercial volume manufacturing, selection between active and passive alignment, or some mix of the two, is determined based on the quality of part needed. Lower cost, lower performance devices are typically manufactured with entirely passive alignment strategies, whereas the manufacture of high performance devices typically involves at least some active alignment.

SUMMARY OF THE INVENTION

In the manufacture of optical systems, it is typically possible to passively align two optical components, such as components including lenses. In micro-optical trains, where beam diameters are typically less than one millimeter and usually less than 500 micrometers, alignment accuracies of 10 micrometers are possible with commercially available bonding machines, such as flip-chip bonders or other techniques utilizing jigs or optical component templates.

Tolerance stack up problems, however, are encountered when constructing more complex optical trains. For example, when more than two lenses must be aligned with respect to each other and possibly a fiber endface, for example, alignment tolerances at the component level become more rigorous because of how the tolerances affect each other in the aggregate.

Moreover, in some optical systems, such as high quality carrier-class systems and/or systems that have tunable optical filters, alignment tolerances of better than 5 micrometers are common. And, in some implementations, sub micrometer alignment tolerances are required, and even sub-100 nanometer tolerances can be required to achieve high side mode suppression ratios, for example, in tunable filter systems or when maximizing coupling efficiency.

In such optical systems, the alignment tolerances are more rigorous than that which can be obtained with conventional passive alignment techniques, especially when constructing optical systems with higher levels of integration. As a result, active alignment can be required. Active alignment, however, can be a slow process, especially when the initial alignment of the optical train is poor.

The present invention is directed to a micro-optical train manufacturing process, in which the positions of optical components on an optical bench are characterized, typically using metrology systems. These optical components are then aligned with respect to each other in a passive alignment step based on data from the metrology system and system design information. As a result, a subsequent active alignment process can be avoided in some situations, or if a subsequent active alignment process is performed, the time required for that active alignment process can be reduced because of this metrology-based passive alignment step.

In general, according to one aspect, the invention features a micro-optical train manufacturing process. This process comprises installing optical components onto an optical bench to form an optical train. The positions of the optical components are then determined or characterized. The optical components are then aligned in response to these determined positions.

The position information can be relative to a coordinate system defined by the bench, for example, or simply relative information that describes the position of the optical train components relative to each other.

In the preferred embodiment, preferably prior to the installation step of the optical components on the optical bench, the optical properties of at least some of the optical components are determined, such as focal length, in some embodiments. Further, the positions of optical elements of the optical components are preferably characterized, especially in implementations in which the optical components comprise optical elements, such as lenses or filters, which are attached to mounting structures. Specifically, the position of an optical element relative to a mounting structure for optical components is determined. In one example, light is transmitted through lens optical elements and the metrology system defocused to image on the light spot of the transmitted light. The mounting structure is then located within the optical train. The optical axis of the optical element is then known by reference to the position of the mounting structure and element offset information.

In the preferred embodiment, bonding processes are used that are compatible with carrier-class optical systems. For example, preferably solder bonding, using eutectic solders for example, or thermocompression bonding, ball bumping, and/or ultrasonic wire bonding are used to attach the optical elements to the mounting structures and the component mounting structures in turn to the optical bench.

In the typical implementation, the optical elements are installed on the optical bench in a relatively fast, but relatively low precision, installation process. Specifically, the optical components are installed on the optical bench to a precision of less than one micrometer, such as within 10 micrometers of their optimal location. Typically, with solder bonding techniques, positions of the optical components can shift by approximately 4 micrometers, in some instances.

Metrology data, however, are collected, providing the location of the optical components on the bench and/or relative to each other.

Then a passive alignment process is preferably performed in which the optical components on the bench are aligned by reference to the metrology data and the desired optical element positions based on the system design. This provides a gross alignment of the optical train, which in some cases will be the only alignment that is required. In the current embodiment, this alignment is performed by plastically deforming mounting structures of the optical components.

Thereafter, an active alignment step is performed, in one implementation, in which an optical signal is transmitted through the optical train and the optical components are then further aligned based upon the transmission characteristics of this optical signal in the optical train. For example, in one implementation, the magnitude of the optical signal transmitted through the optical train is used as the metric for driving the active alignment of the components. In alternative embodiments, a side mode suppression ratio of the filter train, such as in the case of a filter train including a tunable filter, is used as the alignment metric. Again, this final active alignment is performed by plastically deforming the optical elements, in a current implementation.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
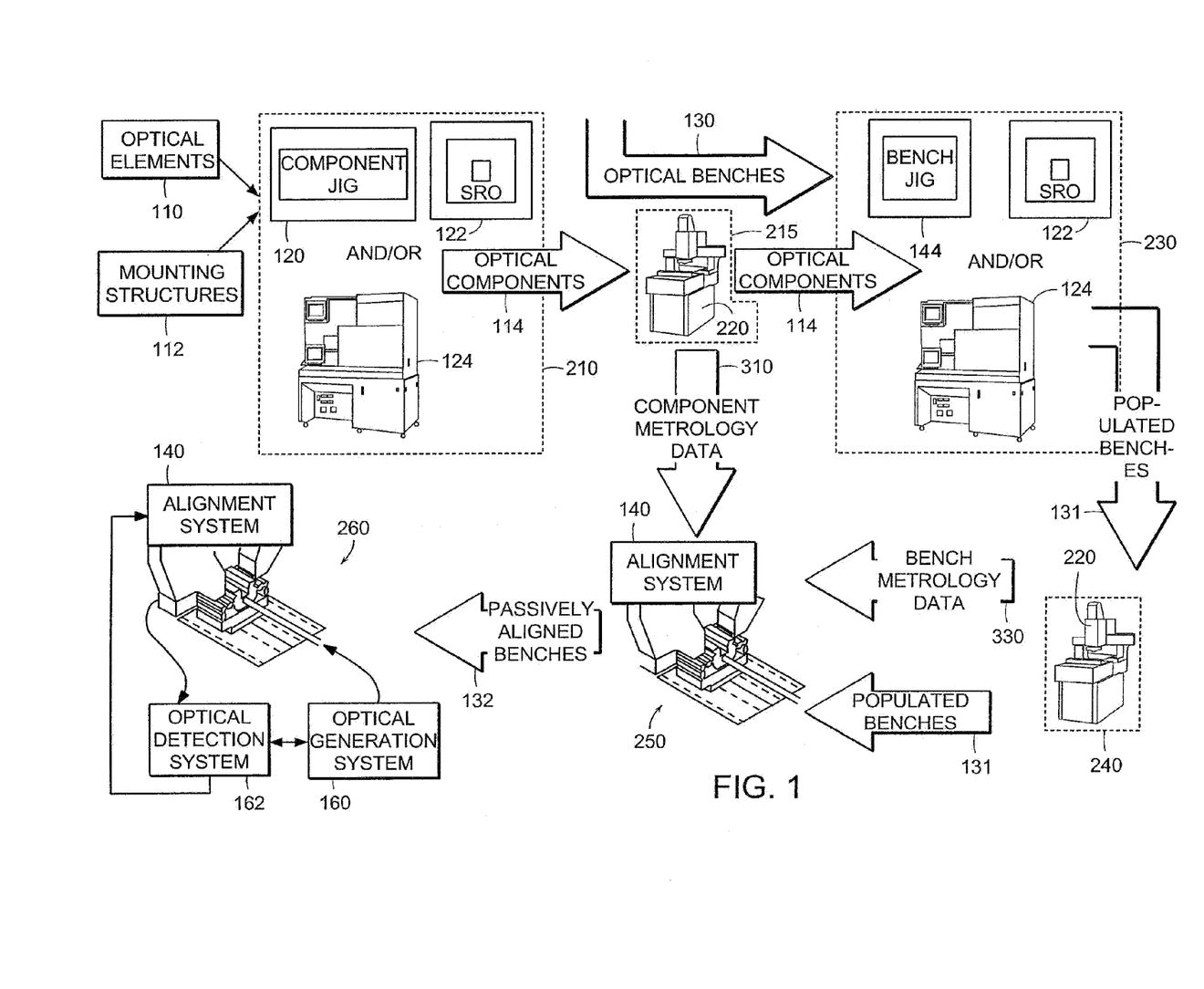
FIG. 1 is a schematic diagram illustrating a micro-optical train manufacturing process according to the present invention.

FIG. 1 schematically illustrates a manufacturing process for a micro-optical train that utilizes the principles of the present invention.

First, the optical elements 110 and the mounting structures 112 are combined into the optical components 114 in an optical component assembly step 210, in the illustrated embodiment.

Figure 2:
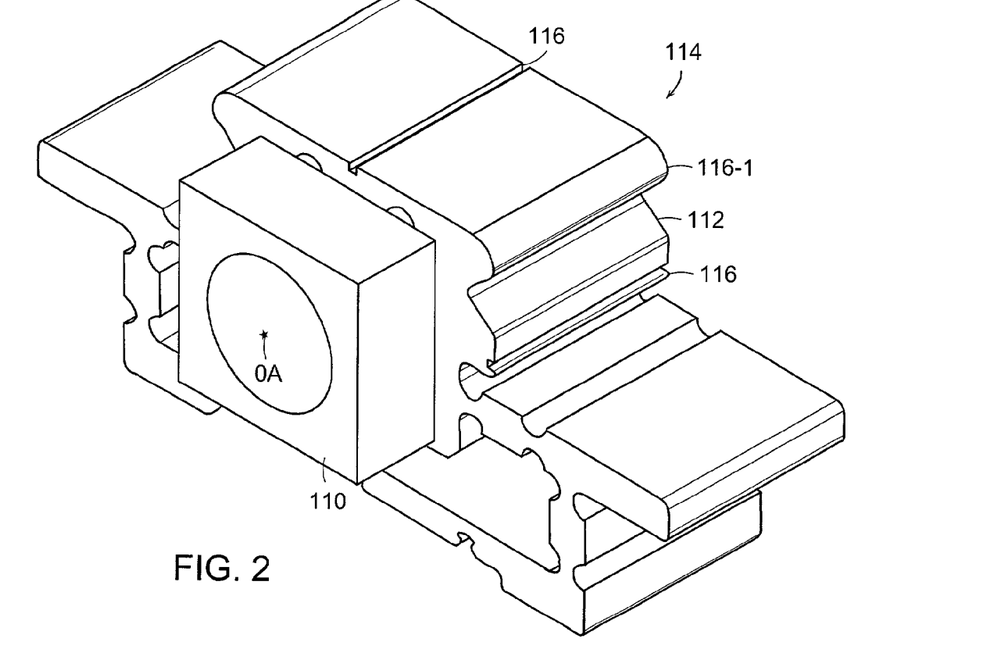
FIG. 2 is a perspective view showing the installation of a lens-type optical element on a mounting structure to form an optical component.

FIG. 2 shows one example of an assembled optical component 114. An optical element 110, such as a concave or convex lens, is installed onto mounting structure 112. In a current implementation, the lens is manufactured from silicon or gallium phosphide using a mass transport process, although the invention is applicable to other micro lens systems. The mounting structure 112 is manufactured from a metal or other plastically deformable substance. Presently, the mounting structures 112 are manufactured using the LIGA process. LIGA is a German acronym that stands for lithography, plating, and molding. Mounting structures manufactured using other microforming, micromanufacturing processes are also relevant, however.

Figure 3:
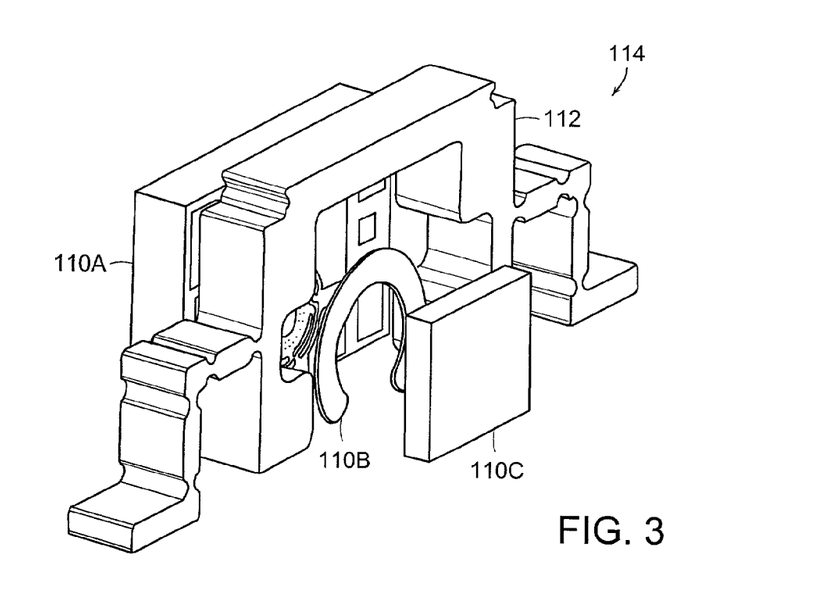
FIG. 3 is an exploded perspective view of a tunable filter optical component in which a tunable filter optical element is installed on a filter mounting structure.

FIG. 3 illustrates assembly of an exemplary tunable filter optical component. Specifically, a MOEMS optical membrane substrate 110A is combined with a concave reflecting lens 110C using an intervening spacer layer 110B. This assembled filter optical element 110 is then installed on a filter mounting structure 112.

In one implementation, the optical elements are bonded to the mounting structures using epoxy. Generally, solder or other metal based bonding is preferred and even required for carrier-class optical system manufacture, such as thermocompression bonding, ball bumping, thermosonic, and ultrasonic bonding.

Returning to FIG. 1, two techniques are illustrated for solder bonding the optical elements 110 to the mounting structures 112.

Specifically, in one component assembly process, a component jig 120 is used to pre-assemble the optical element 110 and the mounting structure 112. For example, this jig has slots for holding a lens substrate and a larger slot for receiving the mounting structure 112. A solder perform or some type of predeposited solder is inserted between the mounting structure and the lens.

After jig pre-assembly, the optical components are inserted into a solder reflow oven (SRO) to reflow the solder and bond the optical elements 110 to the mounting structures 112 to form the optical components 114.

Alternatively, a high precision placement and bonding system is used to install the optical elements 110 on the mounting structures 112. One example of such a bonding system is a flip-chip bonder. Specifically, a Karl Suss FC150 flip-chip bonder is applicable to these requirements.

In still other embodiments, the optical elements and optical components are monolithically fabricated using combinations of existing technologies, such as RIE etched is frame with deformable plated metal structures.

Returning to FIG. 1, regardless of the specific component assembly process, the optical components 114 are the result of the optical component assembly step 210. In the preferred embodiment, these optical components are then provided to an optical component metrology system 220.

In the current embodiment, the optical component metrology step 215 produces optical component metrology data 310 that characterize the position of the optical components 110 on the mounting structures 112.

Referring to FIG. 2, in one example, optical component metrology data 310 are acquired characterizing the location of the optical axis (oa) of the optical component 110 relative to an alignment mark(s) 116 of the mounting structure 112. Alternatively, incidental alignment features of the mounting structure are used on other implementations, such as an edge 116-1 of the structure or a center point between two top edges, for example.

The following table illustrates an example of optical component metrology data 310. Specifically, the x and y axis positions of the mounting structure (MS) are determined in a coordinate system of the metrology system. The optical axis (oa) of the lens optical element is also determined. From this information, the X offset information from the lens relative to the mounting structure is calculated. Similarly, the distance between the optical axis (oa) and the top of the mounting structure is calculated.

|  | Lens 1 lot #/id = | |
| --- | --- | --- |
|  | T1 | T2 |
| MS X Position | 0.00326 | 0.003932 |
| MS Y Position | 0.78388 | 0.779252 |
| oa X Position | −0.002978 | −0.002445 |
| oa Y Position | 0.515247 | 0.51117 |
| X Offset lens | −0.005628 | −0.005638 |
| X Offset centroid | 0.00573 | 0.005891 |
| Lens to MS top Y | 0.268633 | 0.268082 |
| Factor | −1 |  |
| ave X Offset lens |  | 0.0056 |
| ave Lens to MS top Y |  | −0.2684 |

Figure 4A:
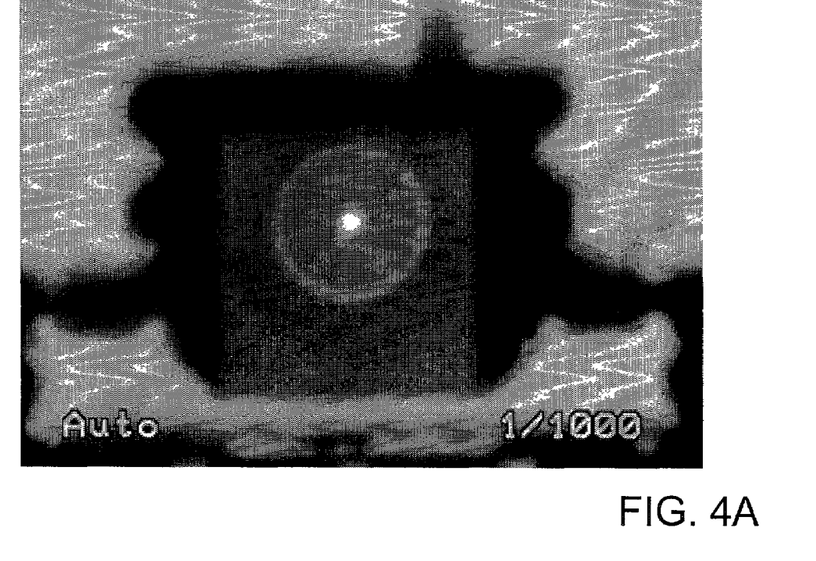
FIGS. 4A and 4B illustrate metrology data collection regarding the location of the optical element relative to the mounting structure of the optical component.

FIG. 4A is an image of an optical component from metrology system 220. Specifically, light is transmitted through the optical element and the optical system of metrology system defocused and so that the optical element's optical axis is apparent based on the focal point of the light that is transmitted through the lens. This allows the metrology system to determine is the location of the figure of merit of the optical element.

Figure 4B:
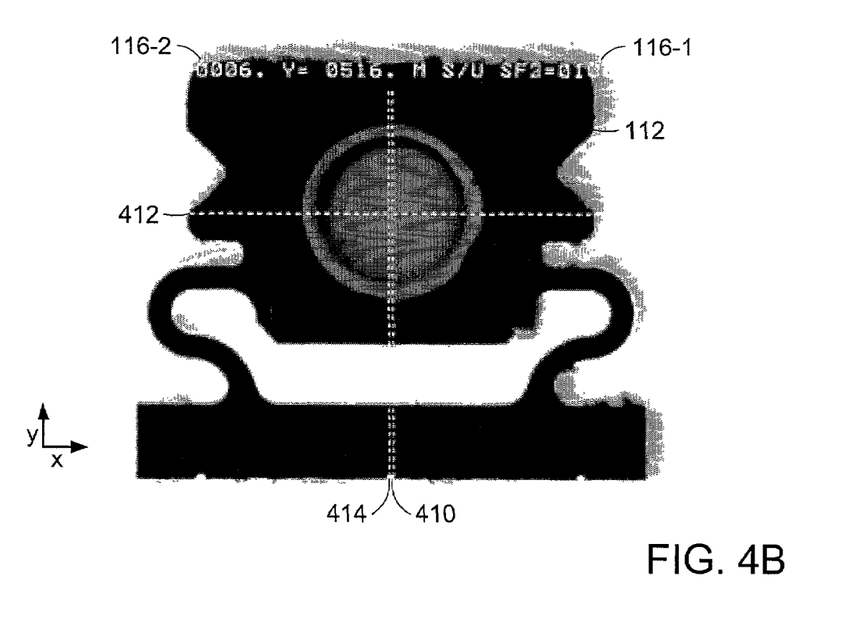

FIG. 4B shows the location of the mounting structure by the metrology system 220. Specifically, the mounting structure is located by reference to alignment features of the mounting structure—in this case a midpoint 410 between edges 116-1, 116-2. Also shown are the x-axis position 414 and y-axis position 412 of the optical axis oa of the optical component of mounting structure 112. This process yields the component metrology data 310, which characterize the relationship between the position of the optical axis oa of the optical element 110, for example, and alignment marks or features of the mounting structure 112.

Referring back to FIG. 1, the characterized optical components 114, along with optical benches 130, are supplied to an optical bench assembly process 230.

In this bench assembly process 230, the optical components 114 are installed on the optical benches 130.

Presently, one of two assembly modalities is used. In one example, a bench jig 144 is used to locate the optical components 114 on the optical bench 130. These assembled benches are then placed in a solder reflow oven 122 to reflow solder between the optical components and the benches to permanently affix the optical components 114 to the benches 130.

In an alternative implementation, the precision placement and bonding machine 124 is again used to place and then solder bond the optical components 114 on the optical benches 130. Typically, machine vision systems are used by the placement and bonding system 124 to precision place the optical components on the benches 130 by reference to alignment features or marks on the benches.

In still other implementations, bonding systems utilizing epoxy bonding are used.

Figure 5:
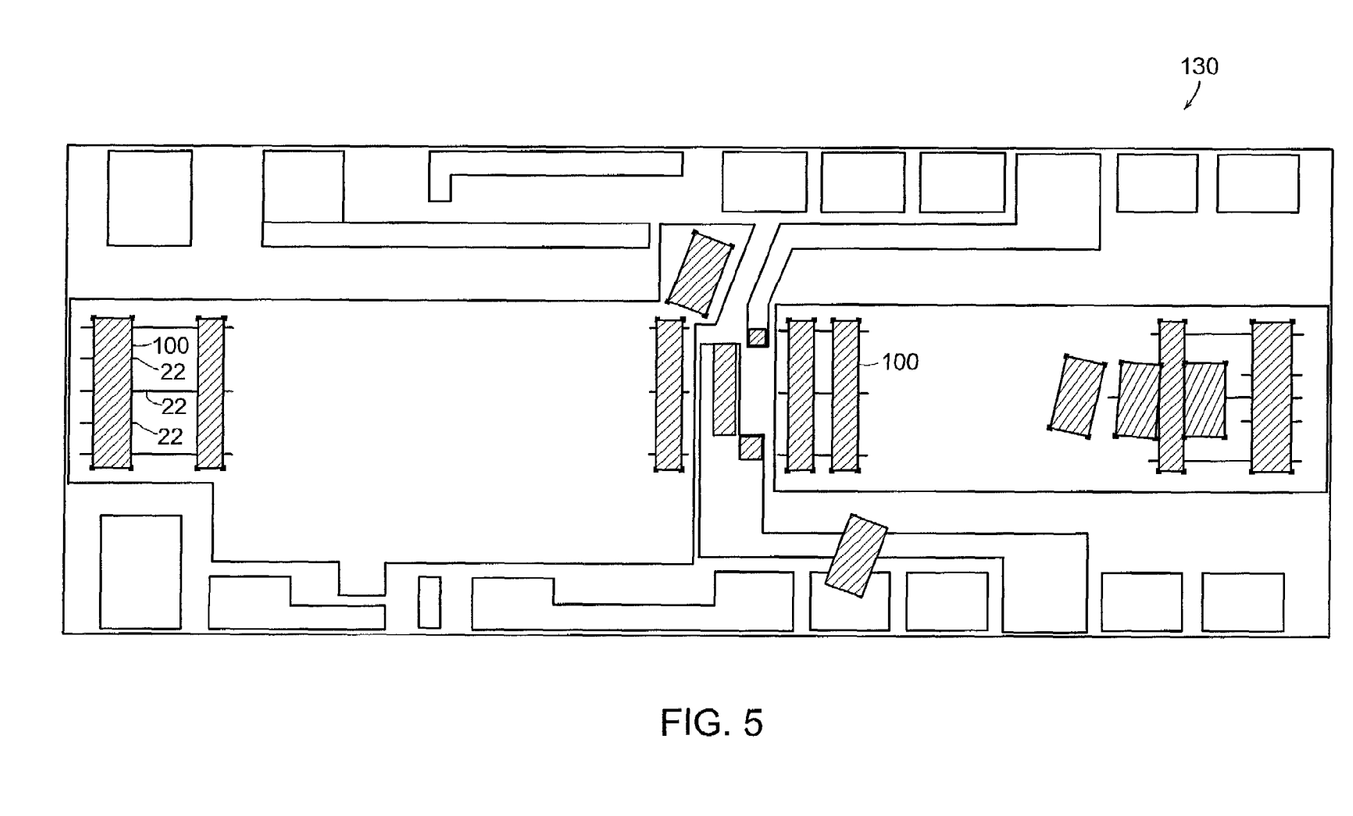
FIG. 5 is a top plan view of an optical bench on which the lens optical components and tunable filter optical components are installed.

FIG. 5 illustrates an example of a non-populated optical bench 130. For example, this bench has metalizations, such as gold and/or predeposited solder areas 100 and bench alignment marks or features 22 that are used by the vision system of the placement and bonding system 124 to locate the optical components 114 relative to the bench 130. In other implementations, physical registration features such as trenches, or raised registration blocks are formed on the surface of the bench 130.

Figure 6:
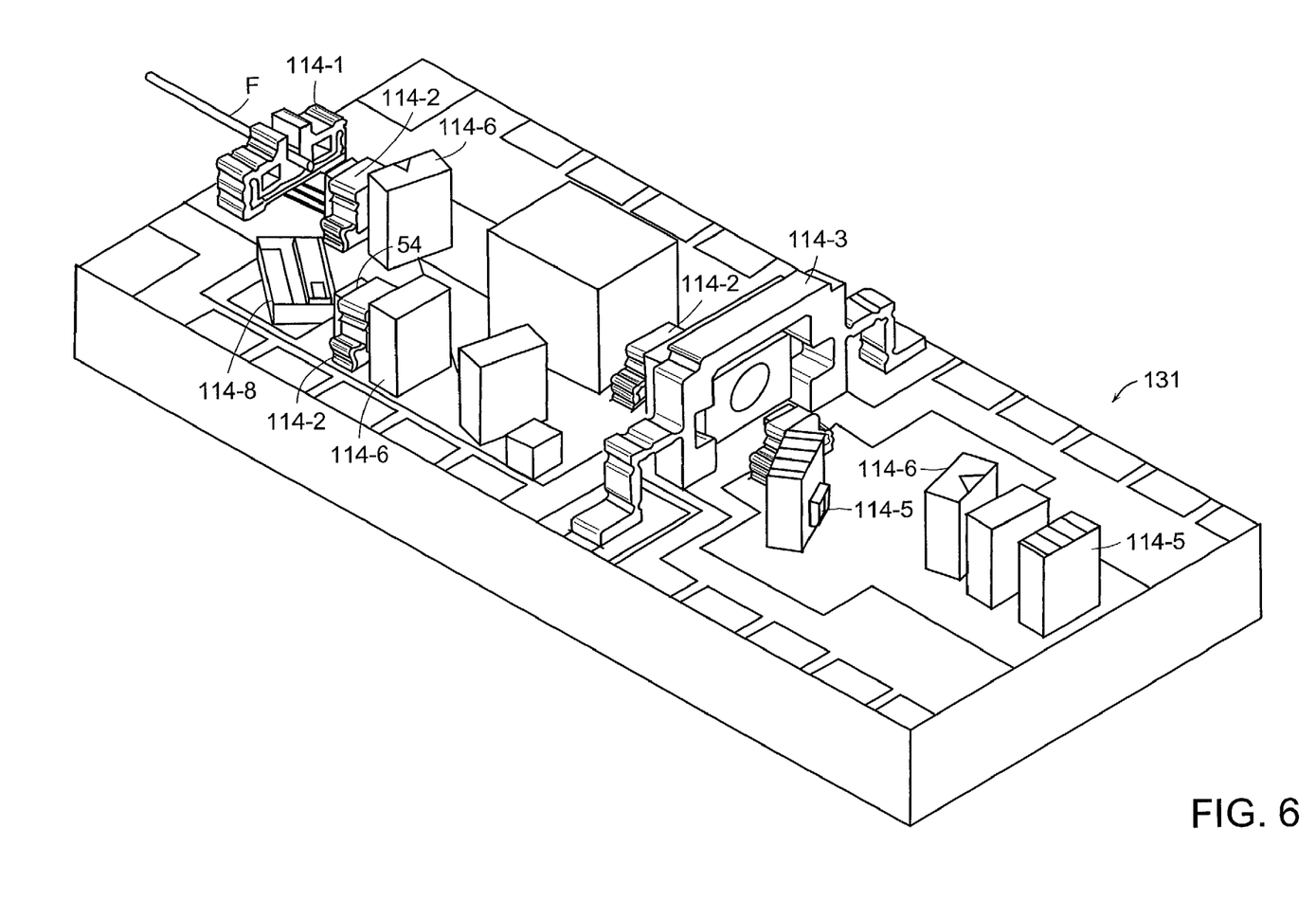
FIG. 6 is a perspective view of an optical system including tunable filter and lens optical components on the optical bench.

FIG. 6 shows an exemplary populated bench that results from the bench assembly step 230 of FIG. 1. In this example, optical components including optical fiber components 114-1, including optical fiber F and an associated mounting structure, lens components 114-2, including lens optical elements 54 and lens mounting structures, tunable filter optical components 114-3, detectors 114-5, active laser components 114-8, and passive filters 114-6 are installed to form the populated bench 131.

Typically, however, even with high precision placement in bench jigs 144 and stability during the SRO run 122 or well-calibrated placement and bonding machines 124, the optical components 114 are typically only installed on the optical bench 132 to placement accuracies of about 4 micrometers, or worse. Further, even in highly automated manufacturing processes, it is difficult to repetitively install the optical components on the optical bench to accuracies of better than 1 micrometer.

Returning to FIG. 1, a bench metrology step 240 is performed using a metrology system 220. Typically, the locations of the optical components 114, and specifically the mounting structures, relative to the bench 130 are measured. This yields bench metrology data 330 that characterize the positions of the optical components relative to alignment features of the optical bench.

In the current embodiment, the metrology system 240 references the alignment features of the mounting structures of the optical components. Typically such metrology systems 240 includes precision bearing staging with microstepper motor control and 0.4 micrometer resolution linear encoder scales in X, Y, and Z axes. An integrated CCD camera acquires high-resolution images for the video image processing system and offers real time display, with geometric dimensioning and tolerancing.

The following table illustrates an example of bench metrology data 330. Specifically, the x and y axis positions of a fiber mounting structure (MS), along with a lens mounting structure are determined in a coordinate system of the bench. Data column T1 represents data acquired by the metrology system 240, including component angle data. The target column is the desired position as dictated by the optical system design. Column Dtarget represents the difference between the target data and measured data. The final lens adj column includes data 310.

| bench metalization define coordinate system | | target | T1 | D target | lens adj |
|---|---|---|---|---|---|
| fiber MS | Angle | 0 | 0.158816 | 0.162 | |
| P3 | X | 0.817 | 0.801167 | (0.016) | |
| P3 | Y | 0 | −0.003306 | (0.003) | |
| P3Z | Z | 0.88 | 0.888752 | 0.009 | |
| Lens MS | Angle | 90 | 90.072345 | 0.072 | |
| P4 | X | 1.828 | 1.82541 | (0.003) | |
| P4 | Y | 0 | −0.006581 | (0.006) | 0.006 |
| P4Z | Z | 0.84 | 0.8514 | 0.012 | (0.268) |

This bench metrology data 330 and populated benches 131 are then passed to an alignment system 140 for a passive alignment step 250 based on the metrology data In the preferred embodiment, this passive alignment is performed by the alignment system by plastically deforming the mounting structures 112 of the optical components 114. The alignment system 140 performs the passive alignment step 250 based upon the bench metrology data 330 and also preferably the optical component metrology data 310. By combining these two data sets, the optical axis of the individual optical elements of the optical train is aligned with respect to each other to almost the accuracy of the metrology system's data.

The passive alignment step 250 yields passively aligned benches 132. These are passed to a preferably similar or even the same alignment system 140 for an active alignment step 260. Specifically, an optical generation system 160 either injects an optical signal into the optical train by a fiber optic link or energizes an active component within the optical system to generate an optical signal and thereby activate the optical train of the optical system of the bench. Simultaneously, an optical detection system 162 detects the optical signal after transmission through at least part of the optical train of the optical system. In one implementation, the optical detection system simply measures a magnitude of the optical signal that it detects. In an alternative embodiment, a spectral analysis of the optical signal can be performed to determine the side mode suppression ratio of the optical system. This is typically most easily accomplished by tuning a tunable filter within the optical train over a single frequency signal such as from a DFB laser. In some implementations, a detector is manually inserted into the optical train by the alignment system 140. Alternatively, an optical signal detector of the optical signal train is monitored to detect the magnitude of the optical signal that it receives.

In either case, the signal from the optical detection system 160 is used as a control signal to the alignment system 140. Specifically, the alignment system 140 plastically deforms the mounting structures 112 of the optical components 114 to improve the alignment of the optical components in the active alignment process 260.

Figure 7:
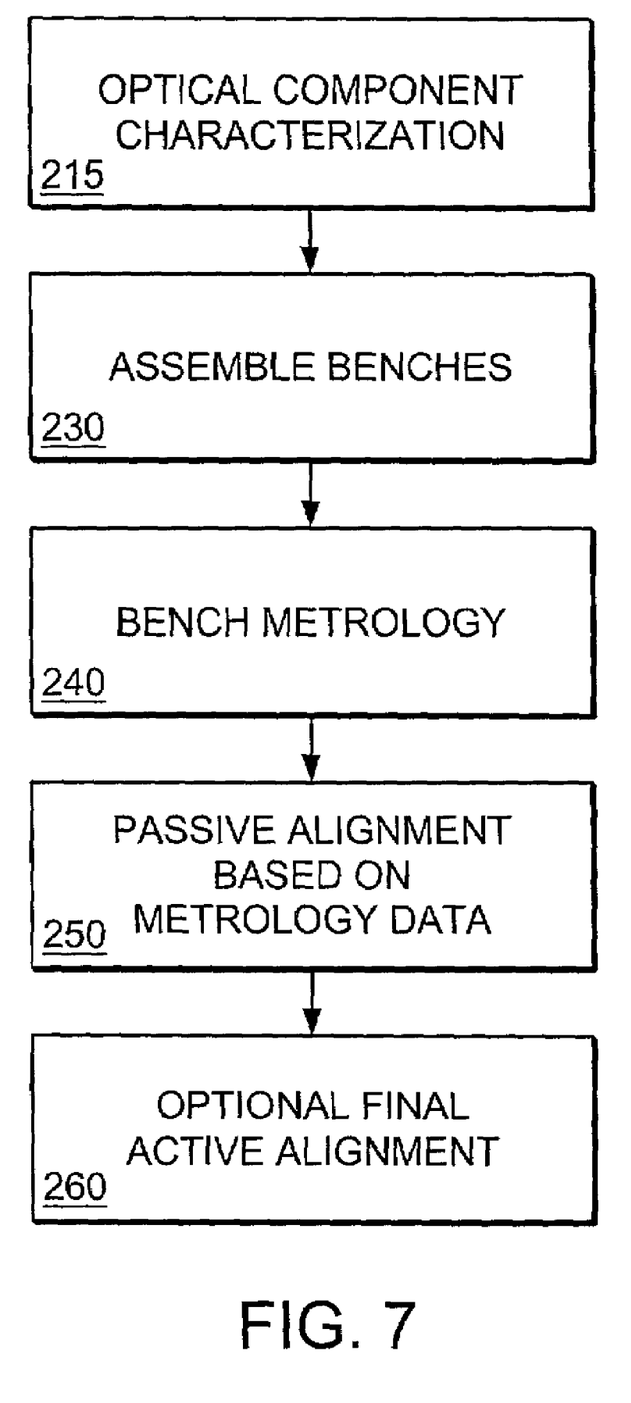
FIG. 7 is a process diagram summarizing the optical train alignment process of the present invention.

FIG. 7 is a process diagram summarizing the manufacturing process of the present invention. Specifically, in an optical component characterization step 220, the locations of the optical axes of optical elements are determined relative to the optical components, and specifically the mounting structures in the illustrated implementation. This is most important when the optical elements 110 have been installed on mounting structures 112 and placement accuracy on those elements is a variable in determining the ultimate alignment of the optical train. This generates the optical component metrology data 310.

In a bench assembly step 230, the optical components 114 are installed on optical benches 130.

In the bench metrology step 240, the location of these optical components 114 on the optical benches 130 is characterized. Typically, in one implementation, the position of the reference features of the optical components 114 are measured relative to reference marks on the optical benches 130. This yields bench metrology data 330 and characterized populated benches 131. This information is used by an alignment system 140 in combination with the component metrology data 310 in a preferred embodiment in passive alignment step 250. Specifically, the optical components are aligned relative to each other on the optical bench using plastic deformation in one implementation.

Finally, in active alignment process 260, an optical signal is transmitted through the optical train and then detected. The characteristics of this detected signal is then used by an alignment system to actively align the optical system.

While this invention has been particularly shown and described with references to preferred embodiments thereof, it will be understood by those skilled in the art that various changes in form and details may be made therein without departing from the scope of the invention encompassed by the appended claims.

What is claimed is:

1. A micro optical train manufacturing process, comprising:
   installing optical components, which include mounting structures, onto an optical bench to form an optical train by bonding the mounting structures to the optical bench;
   after installation of the optical components onto the optical bench, measuring positions of the optical components of the optical train using a vision system; and
   after measuring the position of the optical components, aligning the optical components of the optical train in response to the positions by mechanically engaging and moving the mounting structures to plastically deform the mounting structures.

2. A process as claimed in claim 1, wherein the step of installing the optical components comprises solder bonding the optical components to the optical bench.

3. A process as claimed in claim 1, wherein the step of installing the optical components comprises eutectic solder bonding the optical components to the optical bench.

4. A process as claimed in claim 1, wherein the step of installing the optical components is performed by a precision placement and bonding machine.

5. A process as claimed in claim 1, wherein the step of installing the optical components is performed in a solder reflow oven.

6. A process as claimed in claim 1, further comprising characterizing an optical property of at least some of the optical components prior to installing the optical components on the optical bench.

7. A micro optical train manufacturing process, comprising:
- characterizing an optical property of at least some of the optical components prior to installing the optical components on the optical bench;
- installing and bonding the optical components onto an optical bench to form an optical train;
- after installation of the optical components onto the optical bench, measuring positions of the optical components of the optical train; and
- after measuring the position of the optical components, aligning the optical components of the optical train in response to the positions and in response to the optical property.

8. A micro optical train manufacturing process, comprising:
- determining focal lengths of at least one of the optical components prior to installing the optical components on the optical bench;
- installing and bonding the optical components onto an optical bench to form an optical train;
- after installation of the optical components onto the optical bench, measuring positions of the optical components of the optical train; and
- after measuring the position of the optical components, aligning the optical components of the optical train in response to the positions and the determined focal lengths.

9. A process as claimed in claim 1, further comprising assembling optical components prior to attaching the optical components on the optical bench.

10. A process as claimed in claim 9, wherein the step of assembling the optical components comprises solder bonding optical elements to mounting structures.

11. A process as claimed in claim 9, wherein the step of assembling the optical components comprises thermally bonding optical elements to mounting structures.

12. A process as claimed in claim 1, wherein the optical components are installed on the optical bench to a precision of less than 4 micrometers.

13. A process as claimed in claim 1, wherein the optical components are installed on the optical bench to a precision of less than 1 micrometer.

14. A process as claimed in claim 1, wherein the step of determining the positions of the optical components comprises determining positions of the optical components relative to reference marks on the optical bench.

15. A process as claimed in claim 1, wherein the step of determining the positions of the optical components comprises determining distances between the optical components.

16. A process as claimed in claim 1, wherein the step of determining the positions of the optical components is performed by a vision system by reference to predetermined features of the optical components.

17. A process as claimed in claim 1, wherein the step of determining the positions of the optical components comprises determining positions of optical elements of the optical components.

18. A process as claimed in claim 1, wherein the step of determining the positions of the optical components comprises determining positions of mounting structures of the optical components.

19. A process as claimed in claim 1, wherein the step of aligning the optical components comprises passively aligning the optical train.

20. A process as claimed in claim 1, wherein the step of aligning the optical components comprises plastically deforming the optical components.

21. A process as claimed in claim 1, further comprising, after aligning the optical components in response to the positions, actively aligning the optical components of the optical train.

22. A process as claimed in claim 21, wherein the step of actively aligning the optical components comprises deforming the optical components.

23. A process as claimed in claim 1, further comprising, after aligning the optical components in response to the positions, transmitting an optical signal through the optical train and further aligning the optical components of the optical train in response to the transmission of the optical signal through the optical train.

24. A process as claimed in claim 23, wherein the step of aligning the optical components in response to the optical signal comprises deforming the optical components.

25. A process as claimed in claim 23, wherein the step of aligning the optical components in response to the optical signal comprises deforming mounting structures of the optical components.

26. A process as claimed in claim 23, wherein the step of aligning the optical components in response to the optical signal comprises aligning the optical components to maximize a level of the optical signal that is transmitted through the optical train.

27. A process as claimed in claim 23, wherein the step of aligning the optical components in response to the optical signal comprises aligning the optical components to maximize a side mode suppression ratio of a tunable optical filter in the optical train.

28. A process as claimed in claim 1, further comprising characterizing a position of an optical element on a mounting structure of the optical components prior to installing the optical components on the optical bench by reference to light that is transmitted through the optical element.

29. A micro optical train manufacturing process, comprising:
- characterizing positions of optical elements on mounting structures of optical components prior to installing the optical components on optical benches by reference to light that is transmitted through the optical elements;
- installing optical components onto the optical benches to form optical trains;
- after the installation of the optical components on the optical benches, measuring positions of the optical components of the optical trains; and
- after measuring the positions of the optical components, aligning the optical components of the optical trains in response to the positions of the optical components in the optical trains and the position of the optical elements on the mounting structures of the optical components.

30. A process as claimed in claim 29, wherein the step of installing the optical components comprises solder bonding the optical components to the optical bench.

31. A process as claimed in claim 29, wherein the step of installing the optical components comprises eutectic solder bonding the optical components to the optical bench.

32. A process as claimed in claim 29, wherein the step of installing the optical components is performed by a precision placement and bonding machine.

33. A process as claimed in claim 29, wherein the step of installing the optical components is performed in a solder reflow oven.

34. A process as claimed in claim 29, further comprising determining focal lengths of at least one of the optical components prior to installing the optical component on the optical bench.

35. A process as claimed in claim 29, wherein the step of measuring the positions of the optical components comprises determining positions of the optical components relative to reference marks on the optical bench.

36. A process as claimed in claim 29, wherein the step of measuring the positions of the optical components comprises determining distances between the optical components.

37. A process as claimed in claim 29, wherein the step of measuring the positions of the optical components is performed by a vision system by reference to predetermined features of the optical components.

38. A process as claimed in claim 29, wherein the step of measuring the positions of the optical components comprises determining positions of optical elements of the optical components.

39. A process as claimed in claim 29, wherein the step of measuring the positions of the optical components comprises measuring positions of the mounting structures of the optical components.

40. A process as claimed in claim 29, wherein the step of aligning the optical components comprises passively aligning the optical train.

41. A process as claimed in claim 29, wherein the step of aligning the optical components comprises plastically deforming the mounting structures.

42. A process as claimed in claim 29, further comprising, after aligning the optical components in response to the positions, actively aligning the optical components of the optical train.

43. A process as claimed in claim 42, wherein the step of actively aligning the optical components comprises deforming the optical components.

44. A process as claimed in claim 29, further comprising, after aligning the optical components in response to the positions, transmitting an optical signal through the optical train and further aligning the optical components of the optical train in response to the transmission of the optical signal through the optical train.

45. A process as claimed in claim 44, wherein the step of aligning the optical components in response to the optical signal comprises deforming the mounting structures.

46. A process as claimed in claim 44, wherein the step of aligning the optical components in response to the optical signal comprises deforming mounting structures of the optical components.

47. A process as claimed in claim 44, wherein the step of aligning the optical components in response to the optical signal comprises aligning the optical components to maximize a level of the optical signal that is transmitted through the optical train.

48. A process as claimed in claim 44, wherein the step of aligning the optical components in response to the optical signal comprises aligning the optical components to maximize a side mode suppression ratio of a tunable optical filter in the optical train.

* * * * *

UNITED STATES PATENT AND TRADEMARK OFFICE
CERTIFICATE OF CORRECTION

| | | |
|---|---|---|
| PATENT NO. | : 7,124,928 B2 | Page 1 of 1 |
| APPLICATION NO. | : 09/761514 | |
| DATED | : October 24, 2006 | |
| INVENTOR(S) | : Steven D. Conover, Randel A. Murdza and Margaret B. Stern | |

It is certified that error appears in the above-identified patent and that said Letters Patent is hereby corrected as shown below:

On the title page item (75) Inventors: delete "Margaret A. Stern" and insert --Margaret B. Stern--

Signed and Sealed this

Twenty-sixth Day of December, 2006

JON W. DUDAS
*Director of the United States Patent and Trademark Office*